(12) United States Patent
Waites (10) Patent No.: US 6,788,769 B1
(45) Date of Patent: Sep. 7, 2004

(54) INTERNET DIRECTORY SYSTEM AND METHOD USING TELEPHONE NUMBER BASED ADDRESSING

(75) Inventor: Nigel Waites, San Diego, CA (US)

(73) Assignee: eMediacy, Inc., San Diego, CA (US)

( * ) Notice: Subject to any disclaimer, the term of this patent is extended or adjusted under 35 U.S.C. 154(b) by 142 days.

(21) Appl. No.: 09/687,203

(22) Filed: Oct. 12, 2000

Related U.S. Application Data (60) Provisional application No. 60/159,083, filed on Oct. 13, 1999.

(51) Int. Cl.[7] .............................................. H04M 11/00
(52) U.S. Cl. .............................. 379/93.24; 379/142.01; 709/206
(58) Field of Search ........................... 379/93.24, 90.01, 379/88.13, 88.16, 88.17, 88.18, 88.19, 88.2, 88.21, 142.01; 709/206

(56) References Cited

U.S. PATENT DOCUMENTS

| | | | |
|---|---|---|---|
| 5,483,586 A | 1/1996 | Sussman | 379/201 |
| 5,742,769 A | 4/1998 | Lee et al. | 395/200.36 |
| 5,802,510 A | 9/1998 | Jones | 707/2 |
| 5,812,776 A | 9/1998 | Gifford | |
| 5,813,006 A | 9/1998 | Polnerow et al. | 707/10 |
| 5,850,433 A | 12/1998 | Rondeau | 379/201 |
| 5,940,834 A | 8/1999 | Pinard et al. | 701/102 |
| 5,945,989 A * | 8/1999 | Freishtat et al. | 345/329 |
| 5,978,806 A * | 11/1999 | Lund | 707/10 |
| 5,987,508 A * | 11/1999 | Agraharam et al. | 709/217 |
| 6,014,711 A * | 1/2000 | Brown | 709/206 |
| 6,040,784 A | 3/2000 | Miller | |
| 6,049,596 A * | 4/2000 | Dumaine et al. | 379/93.24 |
| 6,049,835 A | 4/2000 | Gagnon | |
| 6,067,546 A * | 5/2000 | Lund | 707/10 |
| 6,076,121 A | 6/2000 | Levine | |
| 6,097,793 A | 8/2000 | Jandel | |
| 6,104,789 A | 8/2000 | Lund | |
| 6,108,691 A | 8/2000 | Lee et al. | |
| 6,141,413 A | 10/2000 | Waldner et al. | |
| 6,335,966 B1 * | 1/2002 | Toyoda | 379/100.06 |
| 6,353,852 B1 * | 3/2002 | Nestoriak, III et al. | 709/206 |
| 6,625,142 B1 * | 9/2003 | Joffe et al. | 370/356 |

FOREIGN PATENT DOCUMENTS

| | | | | |
|---|---|---|---|---|
| EP | 0926871 A2 * | 6/1999 | | H04M/3/50 |

OTHER PUBLICATIONS

AT&T News Release "McCaw Cellular's new MailFlash Software Links Pagers to Email" Nov. 15, 1993, 2 pages.

* cited by examiner

*Primary Examiner*—Melur Ramakrishnaiah
(74) *Attorney, Agent, or Firm*—Pattric J. Rawlins; Procopio Cory Hargreaves & Savitch LLP (57) ABSTRACT

An Internet directory system and method that is based on user telephone number addressing. The system includes an interactive white and yellow pages directory that is based on telephone numbers. Thus, a user's telephone number is a unique identifier used to key other information within the directory. The telephone number may also be used as the primary component of an email address, domain name, or web site URL for the user. The use of a telephone number as the primary component of an e-mail address or domain name greatly simplifies the process of locating a user. E-mail addresses and domain names may be readily found using standard telephone information services, such as "411", as well as other telephone-based methods for obtaining telephone directory information. This Internet directory system and method brings all communication methods and directory services together using one searchable key, a user's telephone number. The directory entry page may be created, edited and updated by the subscriber using simple html editing or using a voice telephone call or via fax, without the use of a personal computer. Thus, the present invention provides an open directory model wherein the end users construct the directory, and the directory is "living", i.e., dynamically changeable and updateable. The power of the directory is thus placed in the users' hands. The telephone based Internet directory system of the present invention also provides addressing for unified messaging as well as locality in addressing.

12 Claims, 6 Drawing Sheets

| Communication Method | Enabled | Number | Internet Address | Password |
|---|---|---|---|---|
| Business Cellular | ✓ | 512-6665432 | | **** |
| Home Cellular | | | | |
| Pager | ✓ | 512-5645543 | | |
| Email | ✓ | | fred@austin.com | |
| Net2Phone | | | | |

Figure 7 ns
INTERNET DIRECTORY SYSTEM AND METHOD USING TELEPHONE NUMBER BASED ADDRESSING

PRIORITY CLAIM

This application claims benefit of priority of U.S. provisional application Serial No. 60/159,083 titled "Internet Directory System and Method Using Telephone Number Based Addressing" filed Oct. 13, 1999, whose inventor was Nigel Waites.

BACKGROUND OF THE INVENTION

1. Field of the Invention

The present invention generally relates to wired and wireless Internet directory addressing, e-mail, unified messaging services, Internet telephony, instant messaging, video conferencing, and paging, and more particularly to an Internet e-mail and web page directory based on users' telephone numbers.

2. Description of the Relevant Art

The Internet is a global network of networks, which has completely transformed many businesses and processes. The Internet provides various services, including the World-Wide Web, e-mail, file transfer protocol (FTP) and others. Internet e-mail provides the ability for users anywhere in the world to send electronic mail to each other using the Internet. Internet web site addresses allow users anywhere in the world to access information hosted on corresponding web sites. However, people who are not connected or are not currently connected to the Internet generally cannot communicate with users connected to the Internet using e-mail and/or cannot access Internet web sites. Another problem with Internet communications is there is generally no global directory available to users, which lists all communication addresses or web site addresses. Thus, in many cases, a user has no effective means for determining another user's e-mail address, web site address, Voice over IP address, Instant Messaging address or Paging address. Therefore, an improved system and method is desired which provides simplified addressing for Internet and telephone messaging.

SUMMARY OF THE INVENTION

The present invention comprises various embodiments of an Internet directory system and method that is based on user telephone number addressing. The system may include an interactive white and/or yellow pages directory that is based on telephone numbers. Thus, a user's telephone number may be a unique identifier used to key other information within the directory. An end-user may first sign up to use this Internet directory service, and then the user may receive an e-mail account, which is based on his/her telephone number. For example, if a user's telephone number is 123-4567 in area code 512, the user's e-mail address may be 1234567@us512.net. The telephone number may also be used as the primary component of a domain name for the user, such as www.us512.net/1234567/default.htm or 1234567.us512.net. Thus, the user's web page is also constructed using a URL which is based primarily on the user's telephone number. The phone number does not have to be looked up in a database or de-referenced to find the information; the actual telephone number directly allows the information to be found. Thus, this system utilizes users' telephone numbers for a respective user's communication methods and web home page.

The use of a telephone number as the primary component of an e-mail address and/or domain name greatly simplifies the process of locating a user's email address. Email addresses and/or domain names may be readily found using standard telephone information services, such as "411", as well as other methods for obtaining telephone directory information. The user's phone number indicates both the user's e-mail address as well as the home page of the user, wherein both may be stored in the interactive directory. This Internet directory system and method brings all communication methods and directory services together using one searchable key, a user's telephone number. Once the Internet directory entry is made into the main directory, this is available to potential callers by using either the telephone or a computer accessing the Internet. In addition, since most or all of the information required to send Email or access web content is numeric, entry from a conventional telephone or mobile phone is seamless with unaltered end user equipment.

In one embodiment, every member in the Internet directory has a mailbox (email account) as well as an associated web page, wherein the web page may be used as the entry in the directory for the member (as an example, this could be an online local Yellow pages which brings together many small businesses in a virtual neighborhood). For example, a user's web page may be: www.us512.net/1234567/default.htm. This web page may be accessed via the directory page by simply typing in the user's telephone number. For example, a family can have an entry in the directory listing which features a picture of their children, a link to their home and/or business site, etc., and other desired information.

The directory entry page may be created, edited and updated by the subscriber using simple html editing from within a browser or the subscriber may have a link to his own sites. Alternatively, a directory listing or web page can also be created and/or updated using a voice telephone call or via fax, without the use of a personal computer. A user can call in and create or update a listing in the directory by supplying a voice message. The voice message may be stored and placed on the web page for that number, i.e., the web page associated with the user. The voice message may be stored on the web page as an audio file or as a text file that has been generated from the voice message. The telephone caller ID information may be used to obtain the telephone number for the URL of the web page, and then the voice message may then be incorporated in the page. In a similar manner, the user may create or update a web page using a fax method. Hence, a non-computer user can create or update a listing in the directory using only a telephone or a fax machine.

Thus, one embodiment of the present invention provides an open directory model wherein the end users construct the directory, and the directory is "living", i.e., dynamically changeable and updateable. The power of the directory is thus placed in the users' hands.

The telephone based Internet directory system of the present invention also provides addressing for unified messaging. Unified messaging refers to the ability of users to transmit communications using diverse communication mechanisms, such as one or more of e-mail, telephone, wireless telephone, paging, instant messaging or fax, among others.

In one embodiment of the invention, a user (calling party or caller) may dial a telephone number, such as a 1-800 number, to access a callee. In response to the call, a computer asks the calling party to enter the telephone number of the person with which they desire to communicate. The callee who wishes to be contacted has set his/her directory entry to enable various communication methods, which can be accessed according to the privilege of the calling party. A callee user may have various methods defined in their directory entry, such as a telephone number, a wireless telephone or cellular number, a pager number, an email address, and an instant messaging ID. The system responds to the calling party after the calling party enters the number and requests which type of service is desired to be used, e.g., "Press 1 for Cellular, Press 2 for Paging". According to the selection made, the calling party will either be connected via telephone or passed to the appropriate paging carrier. The 1-800 service allows an end user (callee) to control the access that people have through this service by setting up selections in their administration web page. For home users who have multiple users on their main number, the 1-800 number may respond using text to speech, asking the calling party which user they desire to communicate with. In addition, password protection can be applied to limit the people who use certain services. The numbers and the email addresses comprised in the callee's directory may or may not be accessible to the calling parties accessing the records. This is important in order to provide privacy and security to prevent the numbers being used for other means. This also gives a telephone company offering the 1-800 service control over charging for the outbound services, such as Long Distance, Paging etc, as the calling party must go through this 1-800 telephone number, since they do not have direct access to the numbers.

As one example of the above method, one embodiment of the present invention provides the ability for a telephone user to send an e-mail to a person connected to the Internet using voice base messaging and telephone number based addressing. For example, a person in one geographic location which does not have access to a computer, who desires to transmit a message using Internet e-mail, would be able to do so by using a telephone, dialing a local number and inputting the desired voice message (or text message). The user also enters the telephone number- of the target or destination recipient. The email address of the recipient may be manually or automatically constructed using the recipient's telephone number, and the message is sent directly via the Internet using the telephone number-based email address. The desired message arrives in the user's e-mail account, e.g., 1234567@us512.net. When the message arrives at this e-mail account, the message can be viewed directly or forwarded to another location.

The Internet directory system of the present invention includes an inherent organization, which provides locality in addressing. In other words, since a user's area code is used as a partial basis for the user's Internet web page and e-mail account, searches may be more readily performed in a local or geographic region based on this area code. This locality is important in allowing customers, consumers and businesses to cooperate in a local listing service. This locality also provides a very localized searching capability and localized target marketing and advertising. One embodiment of the invention thus may include a "request for quote/information" mechanism for consumers to obtain bids from local businesses, leveraging this local search ability. Using this "request for quote" mechanism, the user may target all service providers in a desired area code or exchange area in a single e-mail and then wait for responses. After responses have been received, the user can examine each service provider's home page in the directory to select the desired service provider.

In one embodiment of the invention, when a business or service provider signs up for the Internet directory service, the business or provider has an option to enable or disable a feedback page. When a business or provider has an enabled feedback page, the user can select and view feedback from other users on their respected business as providing the user more information on the business. Thus, instead of having to "guess" when selecting businesses or providers, and instead of having to tediously call individual references, the user may now readily view other people's feedback and comments with respect to certain businesses or providers.

BRIEF DESCRIPTION OF THE DRAWINGS

The foregoing, as well as other objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE EMBODIMENTS

Figure 1:
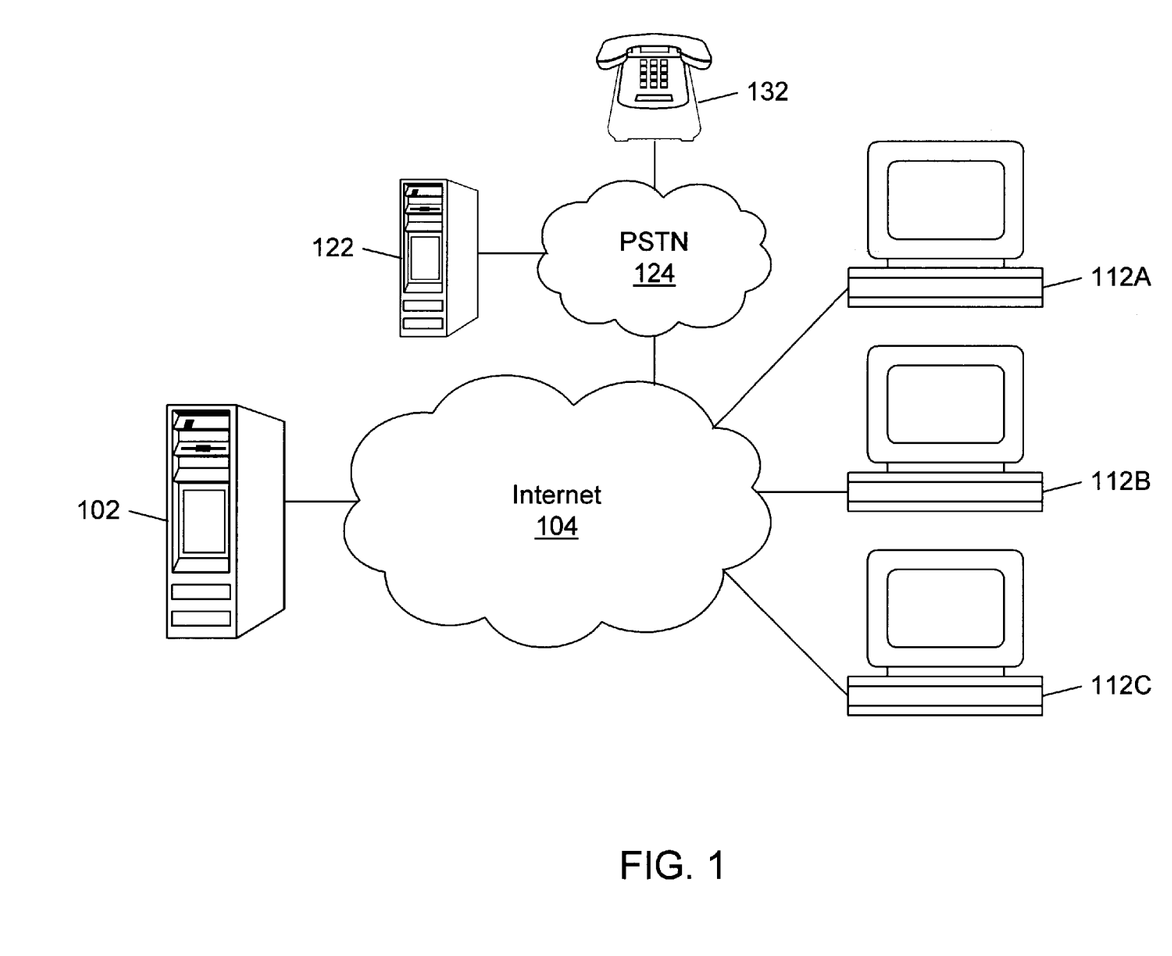
FIG. 1 illustrates an Internet directory system according to one embodiment of the present invention.

FIG. 1 illustrates an embodiment of an Internet system incorporating one embodiment of the present invention. One embodiment of the present invention comprises an Internet Directory System or Internet Directory Service and method that is based on user telephone number addressing.

As shown, a server computer system 102 connects to the Internet 104. The server 102 may have a processor and a memory medium or memory. The memory may store a directory of email addresses and/or web pages which is based on users' telephone numbers. Stated another way, the memory may store a directory of entries, wherein each entry of a respective user may include an email address and a web page address of the respective user that is based on the telephone number of the respective user. The user telephone number may thus be a unique identifier used as the primary or main component of email addresses and web pages. The email address may be specified by the telephone number of the respective user, e.g., the email address may be created by incorporating the telephone number of the respective user into a pre-defined email address format. In a similar manner, the web site address may be specified by the telephone number of the respective user, e.g., the web site address or URL may be created by incorporating the telephone number of the respective user into a pre-defined URL format.

The server 102 may include an interactive white and/or yellow pages directory that is based on telephone numbers. Thus, a user's telephone number may be a unique identifier used to key other information within the directory. The server computer system 102 may include a portion or all of the interactive telephone based directory of the present invention. Thus the directory may be stored on a single server computer system 102 or may be distributed among a plurality of computer systems or servers 102 connected to the Internet.

FIG. 1 also illustrates a plurality of computer systems 112A, 112B and 112C which may be connected to the Internet 104. Computer systems 112A, 112B and 112C represent examples of client or end-user computer systems which utilize the telephone based Internet directory stored, for example, in the computer 102. The computer systems 112 may take any of various forms, such as standard personal computer systems, Internet appliances, network appliances, personal digital assistants (PDAs), televisions, and telephones, such as wireless or cellular telephones.

FIG. 1 also illustrates a telephony device 132 which may be connected through the Public Switched Telephone Network (PSTN) 124 to the Internet 104. It is noted that the Internet 104 generally uses a portion of the PSTN 124 as part of the Internet network. Thus, the PSTN "cloud" 124 and the Internet "cloud" 104 substantially overlap and/or may be considered as a single network. The telephony device 132 may be any of various types of communication devices, such as a standard POTS telephone, a digital telephone, a VoIP phone, a wireless telephone (e.g., a cellular telephone), a wireless PDA, or other device which allows voice communications, etc. As described below, the telephony device 132 may be used to create an entry in the Internet Directory Service, update web page content of a web page in the Internet Directory Service, send email to users of the Internet Directory Service, access web page content of a web page in the Internet Directory Service, and/or access and use various communication methods to access users of the Internet Directory Service.

Figure 2:
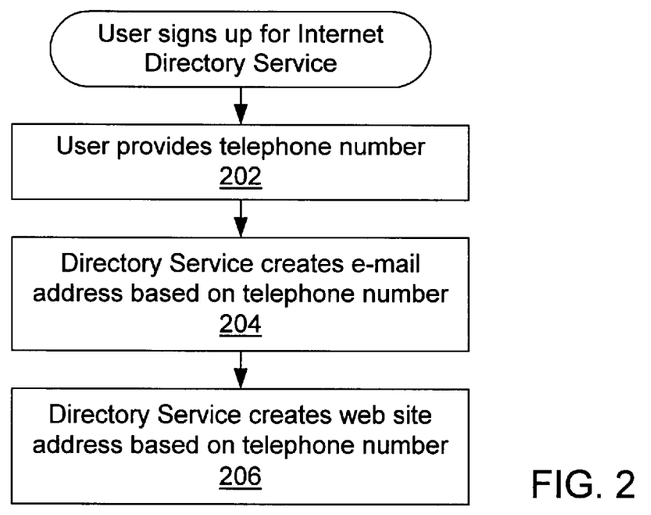
FIG. 2 is a flowchart diagram illustrating one embodiment of a method of a user signing up for the Internet Directory Service and receiving a telephone number based email address and web site address.

FIG. 2—User Signs up for Internet Directory Service (Email Address and/or Web Site URL)

FIG. 2 is a flowchart diagram illustrating one embodiment of a method where a user signs up for an Internet Directory Service according to the present invention.

As shown, in step 202 the user of computer 112A or telephony device 132 who desires an email address and/or web page host may contact the server 102 and sign up for a service. The user may provide his home telephone number, including area code and local telephone number. In one embodiment where the telephony device 132 is used for this purpose, the user's telephone 132 may provide caller ID information to the server 102, and the server 102 may receive and use the caller ID information to obtain one or more of the user's name and telephone number. The user may provide other information to the server 102, such as names of family members, etc.

In step 204 the server 102 may then create an email address based on the user's telephone number, which may include area code and local exchange number, possible as well as the country code. The email address is preferably specified or can be determined based on knowledge of the user's telephone number, possibly in conjunction with knowledge of the format of the email address.

In step 206 the server 102 may also create a web page URL which is based on the user's telephone number and area code. The web page address is preferably specified or can be determined based on knowledge of the user's telephone number, possibly in conjunction with knowledge of the format of the URL.

Thus, an end-user may first sign up to use this Internet directory service, and then the user receives an e-mail account that is based on his/her telephone number. For example, if a user's telephone number is 123-4567 in area code 512, the user's e-mail address may be 1234567@us512.net. The telephone number may also be used as the primary component of a domain name for the user, such as www.us512.net/1234567/default.htm or 1234567.us512.net. Thus, the user's home page is constructed using a URL that is based primarily on the user's telephone number. Thus, this directory system utilizes a user's telephone number for the respective user's e-mail address and web home page. In a similar manner, other users may subscribe or sign up to this service, provide their telephone number, and in return receive an email address and/or web page which is based on their telephone number. International telephone numbers (non-U.S. telephone numbers) may also have a specified email address format and/or web page URL format based on country code, city code and local number.

One embodiment of the invention includes a mechanism for verifying that the directory entry created by the end user is really associated with that user's telephone number. To activate the entry in the page the user may be required to call a 1-800 number with Caller ID enabled from their phone. As further security, when the server identifies the user's number against the directory entry, which was created, the server may ask the user to enter a password the user created when he/she set up the entry on the Web page. Once this is entered and verified, this may enable the entry in the directory. This method ensures that people do not create records for other people, as the user has to verify from his/her home telephone.

In one embodiment every member in the Internet directory may have a mailbox (email account) as well as an associated web page, wherein the web page may be used as the entry in the directory for the member. For example, a user's web page may be: www.us512.net/1234567/default.htm. As one example, a family can have an entry in the directory listing which features a picture of their children, a link to their home and/or business site, etc., and other desired information. The directory entry page may be created, edited and updated by the subscriber using simple html editing or via telephonic or fax means, as described below.

This web page may be accessed via the directory page by simply typing in, keying in, or speaking (relying on voice recognition) the user's telephone number. In other words, when a user types or otherwise enters a telephone number, such as into the server 102 or client 112, the server 102 or client 112 may automatically resolve this telephone number into a web page address or email address based on the entered telephone number.

Thus, one embodiment of the present invention provides an open directory model wherein the end users construct the directory. Stated another way, one embodiment of the present invention provides an open directory model where directory entries, e.g., web pages, electronic communication addresses and email addresses, are automatically and uniformly created based on telephone numbers. Thus the directory is "living", i.e., dynamically changeable and updateable, as well as predictable. The power of the directory is thus placed in the users' hands.

Figure 3:
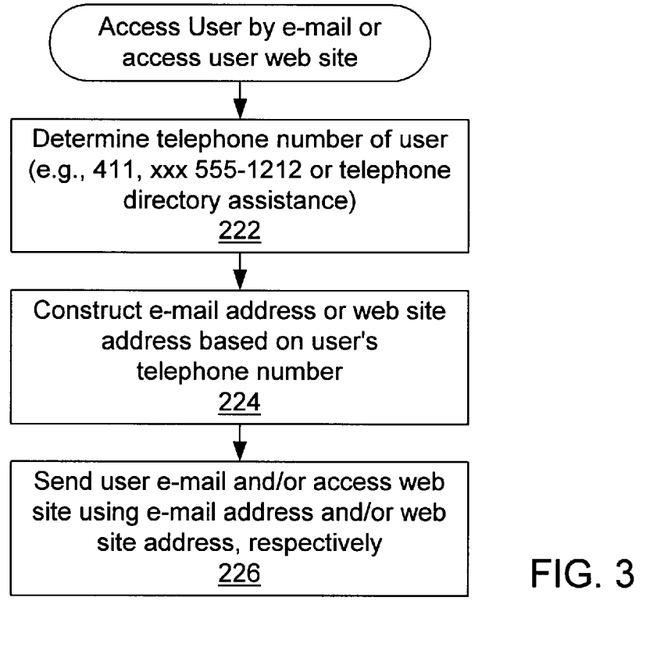
FIG. 3 is a flowchart diagram illustrating one embodiment of a method of accessing a user in the Internet Directory Service.

FIG. 3—Sending a User Email or Accessing the User's Web Site

FIG. 3 is a flowchart diagram illustrating one embodiment of a method where a first user sends a second user email or accesses a second user's web site after the second user has signed up for an Internet Directory Service according to the present invention.

In step 222 the first user may determine the second user's telephone number. The first user may already know the second user's telephone number, e.g., the first user may have the second user's telephone number stored on a rolodex or in a computer contacts folder (e.g., Microsoft Outlook). Alternatively, the first user may determine the second user's telephone number using any of various standard telephony directory assistance techniques. For example, the first user may determine the second user's telephone number by dialing 411, (area code) 555-1212, use a standard white pages or yellow pages, or use Internet assistance, such as Internet white pages or Internet yellow pages.

In step 224 the first user may construct the email address or web site URL based on the second user's telephone number. A first user who desires to send email to the second user or access the second user's web site may only be required to know the second user's telephone number, and perhaps the format of the email address or web site address. As one example, the format of the email address may be "local phone number@country area code.net (e.g., 1234567@us512.net). As another example, the format of the second user's web site may be www.country code area code.net/local phone number/default.htm. If the first user knows this format and the desired second user's telephone number, the first user can easily generate the email address and/or web site address.

Alternatively, the first user need only enter the telephone number of the second user on a device, such as a computer 112 or telephony device 132 (e.g., wireless telephone, PDA, etc.), such as by typing it in, keying it in, or speaking the number. The first user may also simply select the telephone number of the second user from a contact list. The computer 112 or telephony device 132 may then operate to automatically generate the email address and/or web site address based on the input telephone number. Thus, in one embodiment the first user's web browser or wireless device (e.g., wireless phone or PDA) may be operable to automatically generate an email address and/or web site address or URL based on a second user's telephone number, and thus a first user may not be required to remember the particular format.

In step 226 the first user may send an email to the user using the constructed email address and/or may access the user's web site using the constructed URL. In the case of a telephony device 132, the first user may simply dictate a voice message that is provided in an email to the second user, as either voice or text. This example is described in the flowchart of FIG. 5. The first user may also listen to a voice message played on a web site.

The use of a telephone number as the primary component or key of an e-mail address greatly simplifies the process of locating a user's email address. In addition, e-mail addresses may be readily found using standard telephone information services, such as "411", as well as other telephone-based methods for obtaining telephone directory information. The user's phone number indicates both the user's e-mail address as well as the home page address of the user, wherein both may be stored in the interactive directory. This Internet directory system and method brings all communication methods and directory services together using one searchable key, a user's telephone number.

For example, if user A of computer 112A or telephony device 132 desires to communicate with a target user B of computer 112B and does not know user B's email address, the user A can simply utilize various telephone-based information services, such as 411, Internet white pages, Internet yellow pages, etc., to determine the user B's telephone number. Once user B's telephone number has been learned, user B's email address can be readily generated based on this telephone number. For example, knowing the format of a telephone number based email address, user A can readily generate user B's email address. Alternatively, user A's web browser or telephony device 132 may automatically generate user B's email address based on the telephone number of user B. In addition, user B's web page can also be easily generated based on this telephone number, either manually by user A or automatically. Thus this embodiment of the present invention provides a simplified mechanism for determining any user's email address or web page.

Thus, one important aspect of the invention is the use of a telephone number as the basis for an email address and/or a web page, and the use of this data to form a directory from which anyone can access a respective user's email, web home page, cellular number, Voice over IP address, Pager address, Instant Message address or any other form of addressing for a communication service by simply determining the respective user's telephone number.

Figure 4:
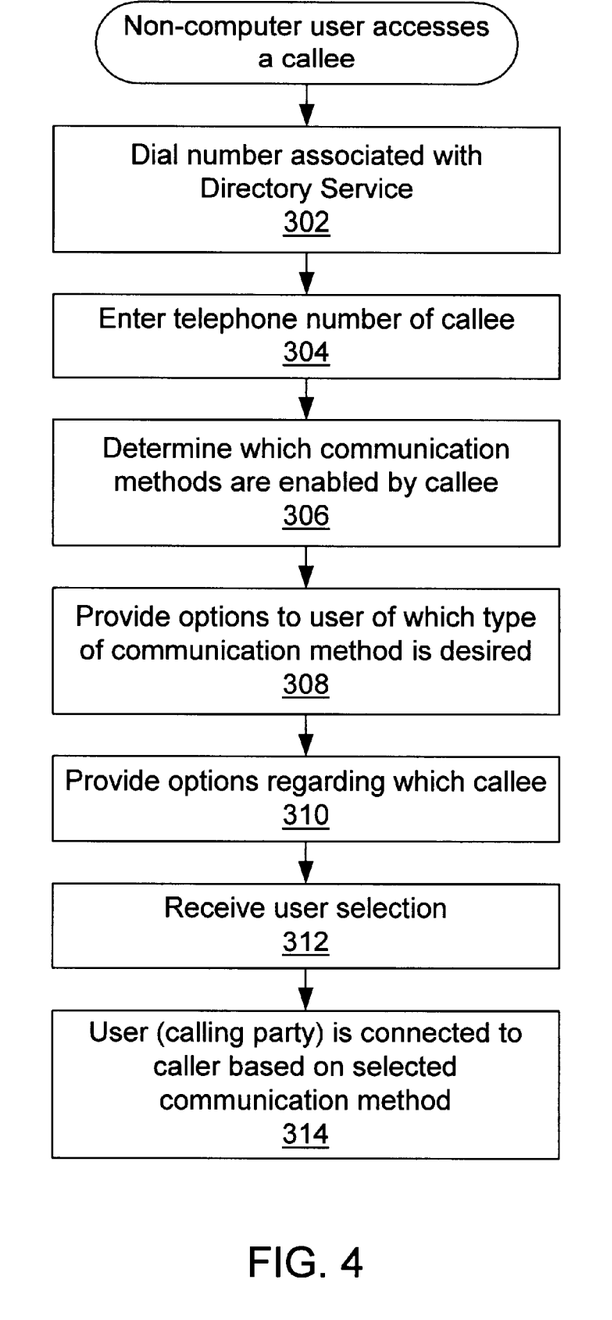
FIG. 4 is a flowchart diagram illustrating one embodiment of a method for a non-computer user to access a callee, such as by using a telephone.

FIG. 4—Non-Computer User Accesses a Callee

In one embodiment of the invention, a telephone user of telephony device 132 may access various communication and/or web site access features through a server computer, such as servers 122 or 102, which may be running a computer telephony application. This application allows a first user to dial into the server using the telephony device 132 and access Internet and/or communication services, such as sending or receiving email to a second user, updating web page content, accessing information from a web site, contacting the second user through various means, etc. The server 122 may respond with a Voice Interactive Response to the first user, providing various information to the first user as well as a means for the first user to generate email messages to the second user (voice to text), obtain information from a web site (text to voice), etc.

FIG. 4 is a flowchart diagram illustrating a non-computer user (first user) accessing another user (second user). As shown, in step 302 a first user may dial a telephone number associated with a Directory Service server, referred to simply as the Directory Service. For example, the first user may dial a 1-800 number associated with the Directory Service. The first user may then be asked to enter the telephone number of the user they wish to contact or call. In step 304 the first user may enter the telephone number of the second user, who may be referred to as the callee. As discussed above, the telephone number of the second user may be used to create the email address of the second user or a web site address of the second user, either manually or automatically.

The Directory Service or database may then be used to allow the first user to select which form of communication he/she would like to use to contact the second user. Examples of typical forms of communication would be cellular or wireless telephones or PDAs, pager, Voice over IP (VoIP), email, web site access, etc. In step 306 the Directory Service may determine which communication methods are enabled by the second user or callee. For example, the Directory Service may access the second user's web site to determine which communication methods are enabled by the second user. In step 308 the Directory Service may provide the determined communication method options to the first user. The options for which a caller (first user) can choose may be controlled by the entry in the directory and hence the receiving party (the second user) may have partial or complete control on allowing access, such as by using passwords to protect some services. For example, the second user may only want his immediate family to be able to access his/her personal cellular number, and hence he/she may protect this number with a password that they only know.

In step 310 the Directory Service may further provide options regarding one or more of a plurality of possible callees or second users. For example, the telephone number entered in step 304 may correspond to the family having a plurality of possible second users, e.g., different family members. In this example, in step 310 the Directory Service may provide options for each of these plurality of possible second users.

In step 312 the Directory Service may receive the first user's selection regarding the desired form of communication and/or the desired second user. For example, the first user may select an option from a voice menu, or may state the name of the desired form of communication and/or the desired second user, wherein the Directory Service uses speech recognition to determine the first user's selections.

In step 314 the first user (the calling party) may be connected to the second user (the callee) based on the selected communication method. For example, the first user may be able to dictate a voice message, that may then be sent in an email as an audio file or converted into text (using a speech-to-text software application). The text may be incorporated into an email and sent to the email address generated from the second user's telephone number. Thus this allows a first user to use a telephone to send an email to a second user, even when the first user does not know a priori the email address of the second user, but rather only knows the telephone number of the second user. The first user may also dictate a voice message that is sent to the second user via other means, such as cellular or wireless telephone, pager, wireless PDA, Voice over IP (VoIP), etc.

Alternatively, the first user may be able to access a web site of the second user. For example, the Directory Service server may use a web site address or URL generated from the second user's telephone number to access the second user's web site and then may either 1) play a voice message stored on the web site; or 2) convert text contained on the web site to speech (using a text-to-speech software application) that is then played on the telephone to the first user.

Figure 7:
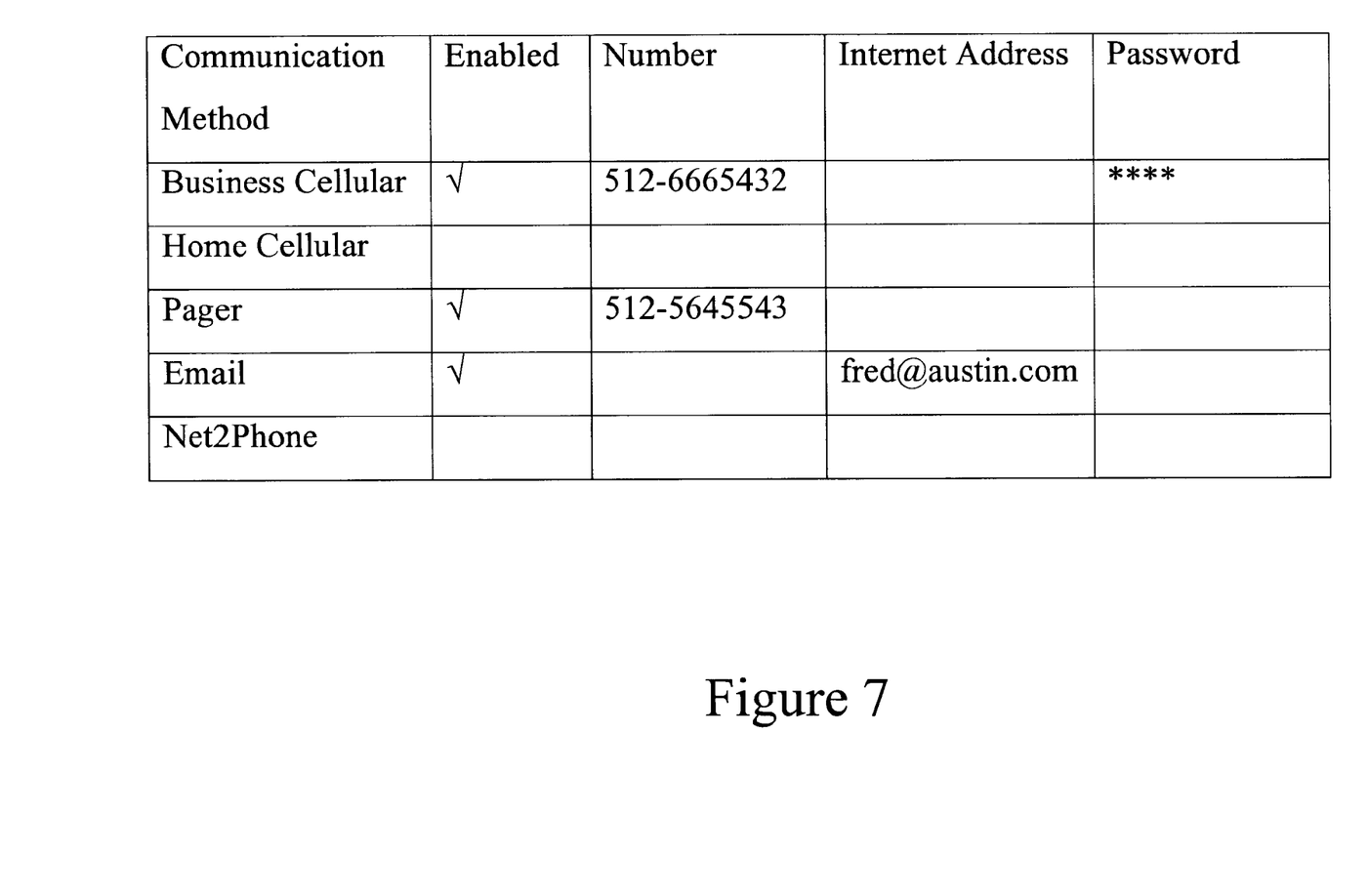
FIG. 7 illustrates various communication methods which may be stored as an entry in the Internet Directory System.

Therefore, in summary, a first user (calling party or caller) may dial a 1-800 number to access a callee or second user. In response to the call, a computer may ask the calling party to enter the telephone number of the person with which they desire to communicate. The callee who wishes to be contacted has set his/her directory entry to enable various communication methods which can be accessed according to the privilege of the calling party. For example, a callee user may have various methods defined in their directory entry, such as a telephone number, a cellular telephone number, a pager number, and an email address. The system responds to the calling party after the calling party enters the number and requests which type of service desired to be used, e.g., "Press 1 for Cellular, Press 2 for Paging". According to the selection made, the calling party will either be connected via telephone, passed to the appropriate paging carrier, or an email may be automatically generated. The 1-800 service allows an end user (callee) to control the access that people have through this service by setting up selections in their administration Web Page. For home users who have multiple users on their main number, the 1-800 number may respond using text to speech, asking the calling party which user they desire to communicate with. For example, assume a family has three people named Bill, Thelma, and Robert. The system will speak the names of each family member and ask the calling party to select the name of the desired callee. After the calling party selects the desired callee, the appropriate options may be given for the communication mechanisms for that callee. Each user (potential callee) in a household may have their own page with the fields shown in FIG. 7. In other words, FIG. 7 illustrates an example of a form that shows a communication option configuration for a user. In addition, password protection can be applied to limit the people who use certain services. It is important to note that the numbers and the email addresses shown in FIG. 7 may or may not be accessible to the calling parties accessing the records. This is important in order to provide privacy and security from the numbers being used for other means. This also gives a telephone company offering the 1-800 service control over charging for the outbound services, such as Long Distance, Paging etc, as calling parties must go through this 1-800 telephone number, since calling parties do not have direct access to the numbers.

Figure 5:
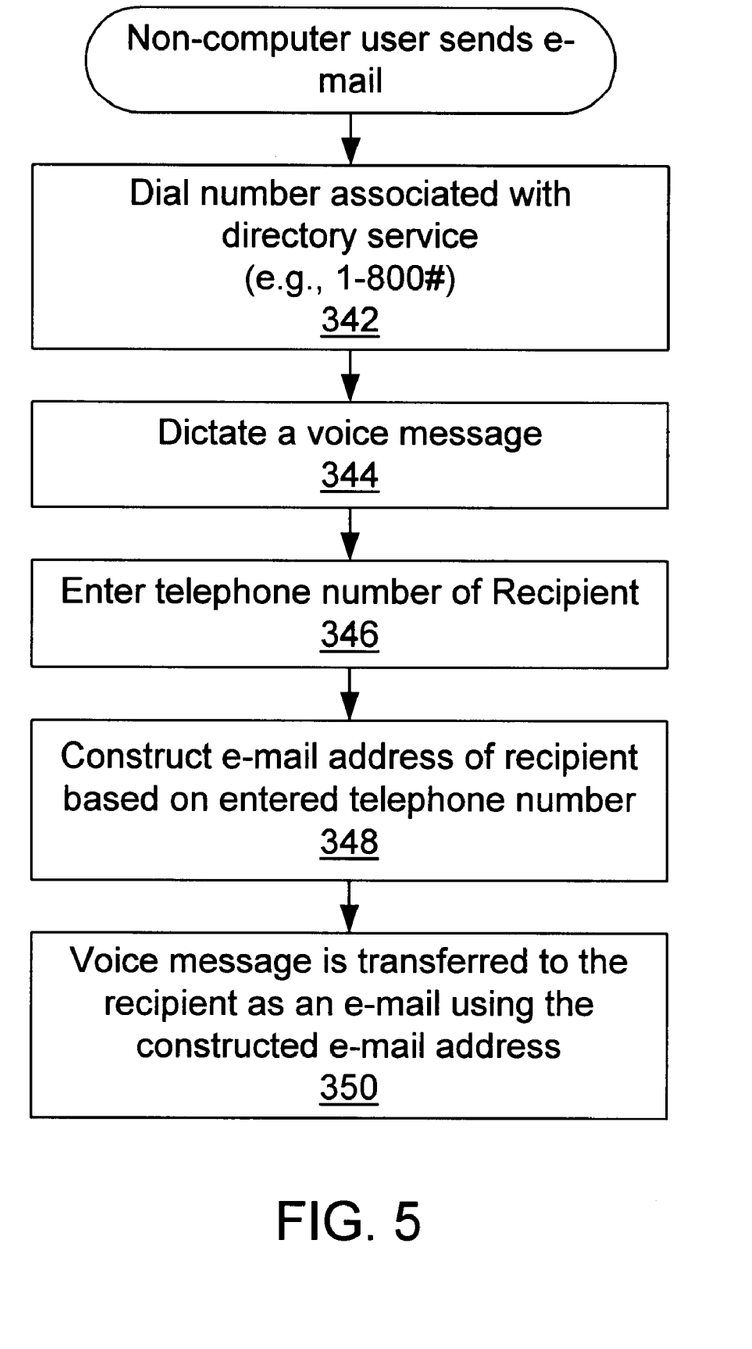
FIG. 5 is a flowchart diagram illustrating one embodiment of a method for a non-computer user to send email to a callee.

FIG. 5—Telephone User Sends Email to Another User

As described above with respect to FIG. 4, and as shown in more detail in the flowchart of FIG. 5, a first user (telephone user) who does not possess a computer system may use telephone 132 to access or communicate with a second user of computer 112A connected to the Internet using the second user's telephone based email address. The telephone user is not even required to know the email address of the second user, but rather the user and/or telephone 132 may only be required to know or obtain the telephone number of the second user.

In one embodiment, as shown in FIG. 5, in step 342 the first user of the telephony device 132 makes, for example, a local telephone call (or 1-800 call or long distance call) to server 122 (or server 102), inputs a voice message in step 344, and enters the telephone number of the desired recipient (second user) in step 346. The telephone number of the desired recipient may be selected from a contact list, input via voice input or may be keyed in on the telephone keypad.

In step 348 one of the telephony device 132 or server 122 receives the message and the recipient's telephone number and uses the recipient's telephone number to generate an email address corresponding to the recipient in step 348. Thus the telephony device 132 may automatically generate the email address based on the recipient's telephone number, or the server 122 (or 102) may automatically generate the email address based on the recipient's telephone number.

In step 350 the server 122 may then provide the message to the recipient using the email address generated from the recipient's telephone number. In other words, the telephony device 132 or server 122 may generate an email to the generated email address that includes the voice message dictated by the first user. As discussed above, the email may contain an audio file of the voice message, or may contain a text file converted from the voice message.

It is noted that step 342 is optional and may be omitted, as desired. For example, step 342 may be performed where the server 122 performs steps 348 and 350. Alternatively, step 342 may be omitted where the telephony device 132 performs steps 344–350.

Therefore, a user of a wireless phone or PDA may simply select a recipient phone number from a contact list or directory assistance or key in the phone number, dictate a voice message, and an email may be automatically generated to the recipient with a form of the voice message, either as audio or text. This greatly simplifies the operation of a user sending email to another user from a wireless phone or PDA. The operation of generating the email address, generating the email message, and transmitting the email message may be performed solely by the server 122 (or 102), solely by the telephony device 132, or by a combination of the server 122 and the telephony device 132, as desired.

As described above, the telephone based Internet directory system of the present application also provides unified messaging. Unified messaging refers to the ability of users to transmit communications using diverse communication mechanisms, such as one or more of e-mail, telephone, paging, or fax, among others. For example, as described above, the present system provides the ability for a telephone user to send e-mail to a person connected to the Internet. For example, a person in one geographic location which does not have access to a computer, who desires to transmit a message using Internet e-mail, would be able to do so by using a telephone, dialing a local number and leaving the desired message. The user then enters the phone number of the target or destination recipient and the message is sent directly via the Internet using the telephone number-based email address. The desired message arrives in the user's e-mail account, e.g., 1234567@us512.net. When the message arrives at this e-mail account, the message can be viewed directly or forwarded to another location.

In one embodiment, each member of the household can create his or her own email account and a link/icon may be displayed for each mailbox on the family's or business' homepage which is described by their telephone number. This homepage forms a quick one-stop place in which everybody in a household can check the status of their Email. When a household accesses the main household page, a small mailbox icon will show which accounts have or do not have mail. This homepage view means multiple people can check their mailboxes from a single page and they never have to login to actually check to see if they have email. In one embodiment, a cookie is stored on the household's machine which has a low security password that returns a flag to whether they have mail or not. To actually read the mail each user may click on his/her link that will bring up a login and password, hence the actual mail is secure.

In one embodiment, email accounts may include a "junk mail" box for receiving advertising email and other "spam" email. For example, since every household will have a mailbox for each family member, a junk mail box may be associated with each household. Each directory entry may have a profile that provides the user a choice of categories for different advertiser's mailings that can be localized given the system's inherent organization around telephone numbers. These mailings will be sent to the junk mail box, which separates personal mail from bulk mail. This invention gives a user a way to receive advertisements on their targeted areas without having the mail arrive at their personal mailbox.

Since the mailbox or email address is tied directly to the telephone number, the directory automatically supports forwarding when a person moves. When a person moves to a new telephone number, all their messages can be forwarded to their new Email box at their new number. At the point at which the telephone company recycles the number and issues it to a new user, the new user may register himself for this telephone number and the forwarding from the old number will no longer occur. Hence, this system enables an email box to follow a person with their telephone number.

Validating Directory Entries

One embodiment of the present invention includes a method for validating the origination of an entry in the directory. This is desired to ensure that a directory entry includes the correct phone number of the user who created the entry, as any user can create an entry page. In one embodiment, a user may provide the information to participate in the directory by submitting an on-line form in which a password is established. After completion of this form, the page is not activated until the user calls a 1-800/local number from their telephone number. When the user places the call to this number to activate the page, caller ID information is transmitted which identifies the user's telephone number. When the caller's ID is read and verified, a password may be requested via an Interactive Voice response. Once the user enters the correct password, the Page is activated. Thus, in order to request an entry in the directory for a certain telephone number, the user may be required to place a telephone call from a telephone that has this certain telephone number. This operates to prevent people from creating pages with incorrect telephone numbers. This invention will control misuse of the directory by providing inherent "switch on" capability by the originating phone.

Creation and Updating of Directory Entries without a Computer

Figure 6:
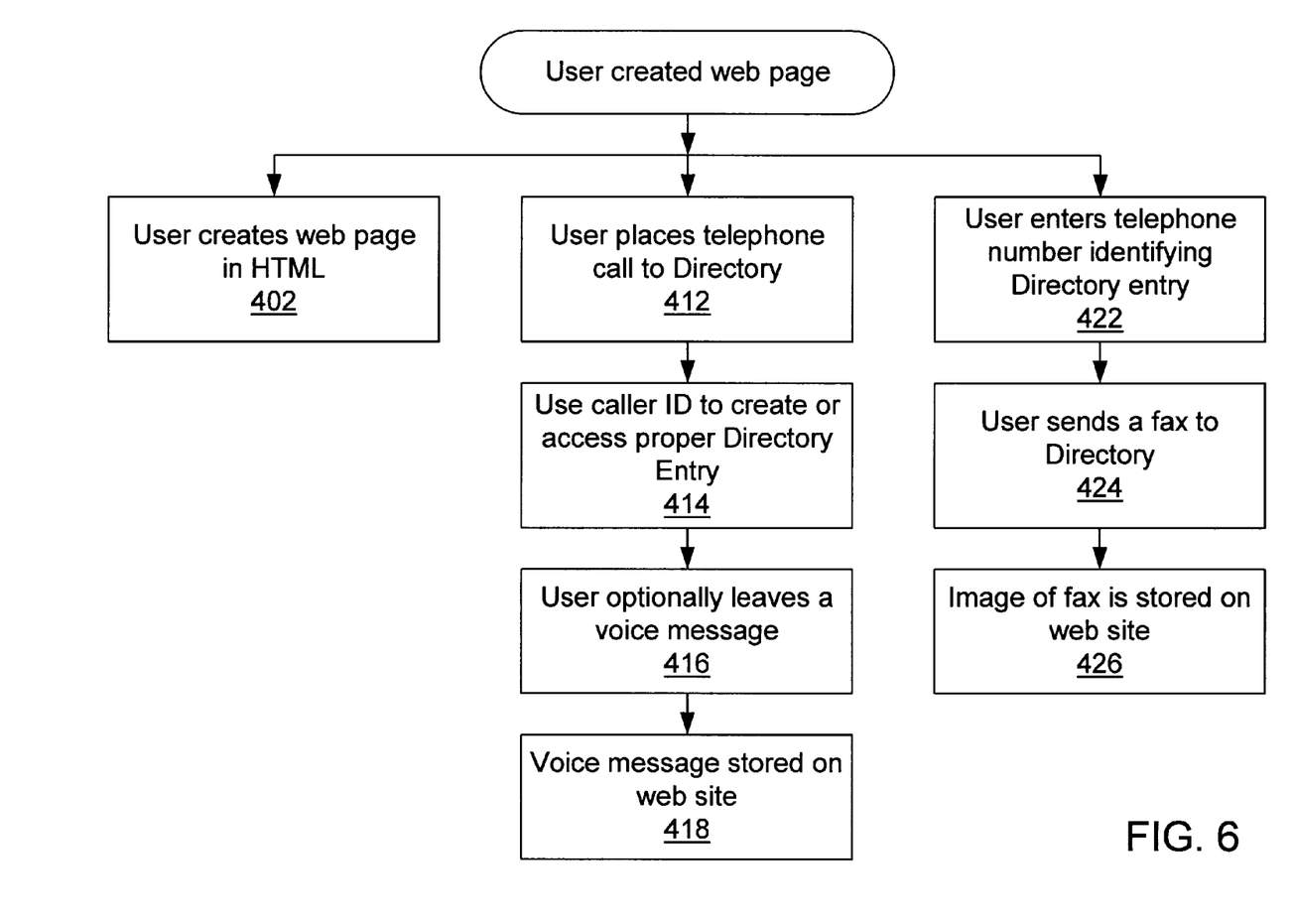
FIG. 6 is a flowchart diagram illustrating various methods that may be used to create web page content.

FIG. 6 illustrates various methods for creating a directory listing, such as a web page and/or email address. As shown, in 402 the user may create a web page using a computer and standard html techniques. Alternatively, the user may create a directory listing using telephony or fax techniques. Thus, a directory listing, e.g., a web page and/or email address, can also be created and/or updated without the use of a personal computer.

For example, in step 412 the user may place a telephone call to the Directory server.

In step 414 the telephone caller ID information may be used to obtain the telephone number of the user, which may then be used to automatically create an email address and/or a web site. Alternatively, the user may key in his/her telephone number, which may then cause creation of an email address and/or a web site for the user. If the user has already created an email address and/or a web site, the caller ID information and/or the telephone number keyed in by the user may simply be used to reference the existing Directory listing, e.g., the existing email address and/or web site.

In step 416 the user may optionally leave a voice message. In step 418 the voice message may be stored and placed on the web page for that number, i.e., the web page associated with the user. The voice message may also be converted into text that is stored on the web page.

Thus the telephone caller ID information or the keyed in telephone number may be used to obtain the telephone number for the URL of the web page, and then the voice message may then be incorporated into the web page, as either audio or text. Hence, a non-computer user can create a listing in the directory, including creation of an email address, creation of a web site, and generation of web site content, using only a telephone.

A callback mechanism may be used to validate the page, e.g., the originating page that has been created using the phone number is called back several hours later and a password is entered to activate the page. The user can also place subsequent telephone calls to update or supplement the web page with new voice messages.

In the above manner, a facsimile (fax) can also be used to create or update a web page. In step 422 a user may dial a Directory telephone number and enter his/her telephone number identifying his/her Directory entry and optionally a password. Step 422 may be accomplished by the user dialing a fax number and sending a fax with this information. In step 424 the user may then fax the page desired to be displayed on the Web page. Later the system may optionally return the telephone call at the number input in step 422 to verify the fax or the password. In step 426 the web page may be activated or updated with the contents of the fax. In other words, the image of the fax may be stored on the web site. The user can also transmit subsequent faxes to update or supplement the web page with new material.

Using the methods described above, a business user can use either voice or fax methods to post, e.g., create or update, their directory listing into the on-line directory. First the business user may be required to obtain an authorization code, such as through a credit card application. When a business user desires to create a voice message for their business web page listing, the business user calls the 1-800 number and then enters his/her telephone number. The directory system looks up the number in the directory database, and the business user may then be asked to verify a password. After verifying the password, the business user is able to input a voice message. The voice message may be stored as an audio file that will be played whenever a user displays the business user's web page in a browser. Alternatively, the voice message may be converted to text and placed in the web site.

A business user may also desire to use a fax machine to create and/or update his/her page. In one embodiment, after registering, the business user may receive a fax with a pre-printed telephone number and a set of unmarked boxes for a password. The business user may send this fax back with the checkboxes checked for their password and then attach a second page, which is the information to be displayed on their page. The directory system may automatically process the first page, deducing the number and verifying the password. The directory system may then use the image in the second page to create or update the web page for the user. The first page may be a key, which is used as an identification to post an update to the page, as the originating telephone number of the fax is probably not the telephone number being accessed, as is the case with a consumer entry. For example, a small delicatessen or restaurant can fax their specials up to their web page on a daily basis, without the need to have a computer.

Hence using the above techniques both businesses and consumers can update their pages in the directory structure using various means. In addition, business customers will be able to select categories of their business using the same techniques as explained above. A category sheet may be faxed with the telephone page. The business user may complete the category sheet to have their listings entered in the database for different services. Likewise, an automated voice system may allow users to enter their categories through a touch-tone phone. Hence all administration for their entry can be accomplished without a computer.

In one embodiment, users who request a product or service using the directory system will cause non-computer business users to receive either a fax or a voice telephone call in which the message is conveyed either graphically or via text-to-speech for phone users.

Hence using the above techniques both businesses and consumers can create and/or update their web pages in the directory structure using various means. Thus the present system provides a global Internet directory comprising entries for computer users as well as non-computer users. The present invention leverages the fact that not everyone has access to the Internet, and users can still be listed in the directory even if they do not own or use a computer.

Charging

In one embodiment, consumer users are not charged anything for listing their entries. Business users may be charged when they activate an email address or web page. If business users activate online, they may use a standard secure credit card procedure to activate their accounts.

Localized Searching

The Internet directory system includes an inherent organization that provides locality in addressing. In other words, since a user's area code is used as a partial basis for the user's Internet web page and e-mail account, searches may be more readily performed in a local or geographic region based on this area code. This locality is important in allowing customers, consumers and businesses to cooperate in a local listing service. For example, using current prior art technology, in a user's search on the Internet for a plumber in Austin, the results are very sporadic. The present invention operates to inherently organize telephone numbers by area code and local exchange and thus provides a very localized searching capability.

The system thus may include a "request for quote" mechanism for consumers to obtain bids from local businesses, leveraging this local search ability. Thus, a user who desires plumbing repairs may write a short description of the job and post it to all plumbers in the local exchange, area code or zip code. The e-mail is then routed to the local plumbers. This provides considerable time savings, as opposed to the user having to manually search through the yellow pages and call each plumber individually. Using this "request for quote" mechanism, the user may target all service providers in a desired area code or exchange area in a single e-mail and then wait for responses. After responses have been received, the user can examine each service provider's home page in the directory to select the desired service provider.

In one embodiment of the invention, when a business or service provider signs up for the Internet directory service, the business or provider has an option to enable or disable a feedback page. When a business or provider has an enabled feedback page, the user can select and view feedback from other users on their respected business as providing the user more information on the business. Thus, instead of having to "guess" when selecting businesses or providers, and instead of having to tediously call individual references, the user may now readily view other people's feedback and comments with respect to certain businesses or providers.

Although the system and method of the present invention is described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A telephone based Internet directory system, comprising:

a server computer system having a data storage area, wherein the data storage area comprises a plurality of entries corresponding to a plurality of users and each entry has an email address for the respective user;

wherein each email address comprises a username part and a domain part;

wherein, for each respective user, the username part of the email address comprises a local telephone number of the user;

wherein, for each respective user, the domain part of the email address; comprises an area code of the user; and wherein an email address for the respective user is usable to send an electronic mail directly to the respective user.

2. The system of claim 1, wherein the server computer system is further configured to create a new user entry in response to receiving a telephone call from a new user.

3. The system of claim 2, wherein the server computer system obtains the telephone number of a new user from caller identification information during the telephone call from the new user.

4. The system of claim 2, wherein the server computer system obtains the telephone number of a new user from caller identification information during the telephone call from the new user.

5. A telephone based Internet directory system, comprising:

a server computer system having a data storage area, wherein the data storage area comprises a plurality of entries corresponding to a plurality of users and each entry has an web page address for the respective user;

wherein each web page address comprises a user page part and a domain part;

wherein, for each respective user, the user page part of the web page address comprises a local telephone number of the user;

wherein, for each respective user, the domain part of the web page address comprises an area code of the user; and wherein a web page address for the respective user is usable to view content related to the respective user.

6. The system of claim 5, wherein the server computer system is further configured to create a new user entry in response to receiving a telephone call from a new user.

7. A method for creating an email address for a user, comprising:

receiving a telephone number for a user;

parsing the telephone number to obtain a local telephone number and an area code;

generating an email address for the user, the email address comprising a username part and a domain part, wherein the username part of the email address comprises the local telephone number and the domain part of the email address comprises the area code; and storing the email address in a memory, wherein the email address is usable to send an electronic mail directly to the user.

8. The method of claim 7, wherein the receiving step further comprises receiving the telephone number during a telephone call from the user.

9. The method of claim 8, further comprising obtaining the telephone number of the user from caller identification information during the telephone call from the user.

10. The method of claim 8, further comprising obtaining the telephone number of the user from caller identification information during the telephone call form the user.

11. A method for creating a web page address for a user, comprising:

receiving a telephone number for a user;

parsing the telephone number to obtain a local telephone number and an area code;

generating a web page address for the user, the web page address comprising a user page part and a domain part, wherein the user page part of the web page address comprises the local telephone number and the domain part of the web page address comprises the area code; and storing the web page address in a memory, wherein the web page address is usable to view content related to the user.

12. The method of claim 11, wherein the receiving step further comprises receiving the telephone number during a telephone call from the user.

* * * * *